Jan. 17, 1939.   F. A. SCHMIDT   2,143,902
APPARATUS FOR CONTROLLING REFRIGERATION
Filed Jan. 22, 1936   9 Sheets-Sheet 3

INVENTOR
F.A.Schmidt
BY
ATTORNEY

Jan. 17, 1939.  F. A. SCHMIDT  2,143,902
APPARATUS FOR CONTROLLING REFRIGERATION
Filed Jan. 22, 1936  9 Sheets-Sheet 6
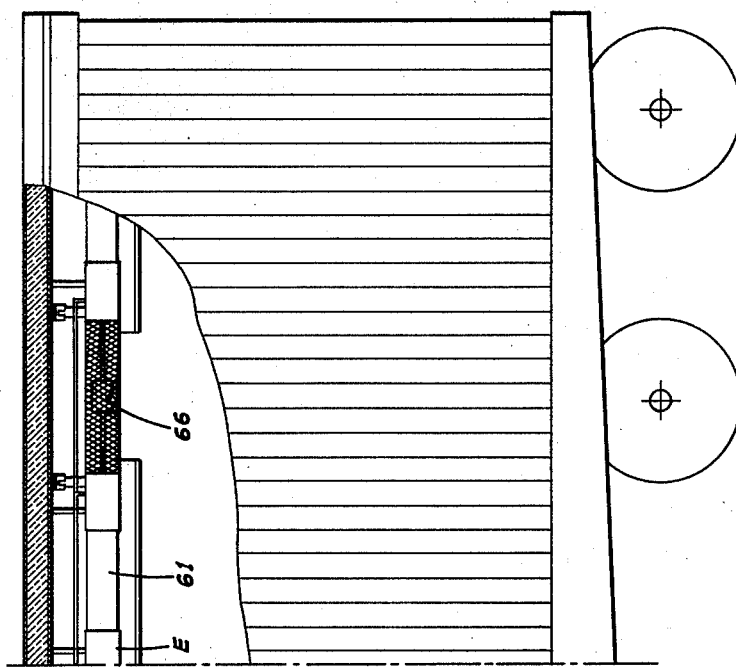
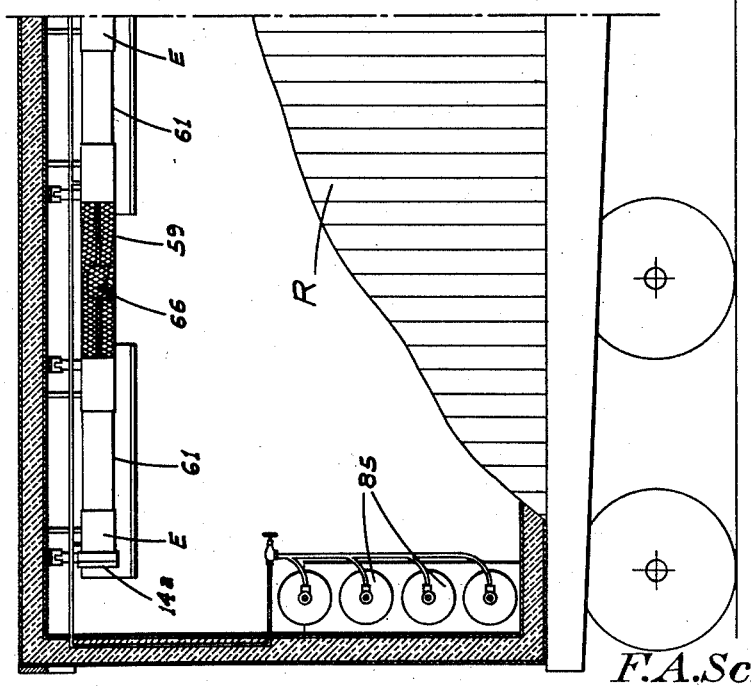
Fig. 7
INVENTOR
F. A. Schmidt
BY
ATTORNEY

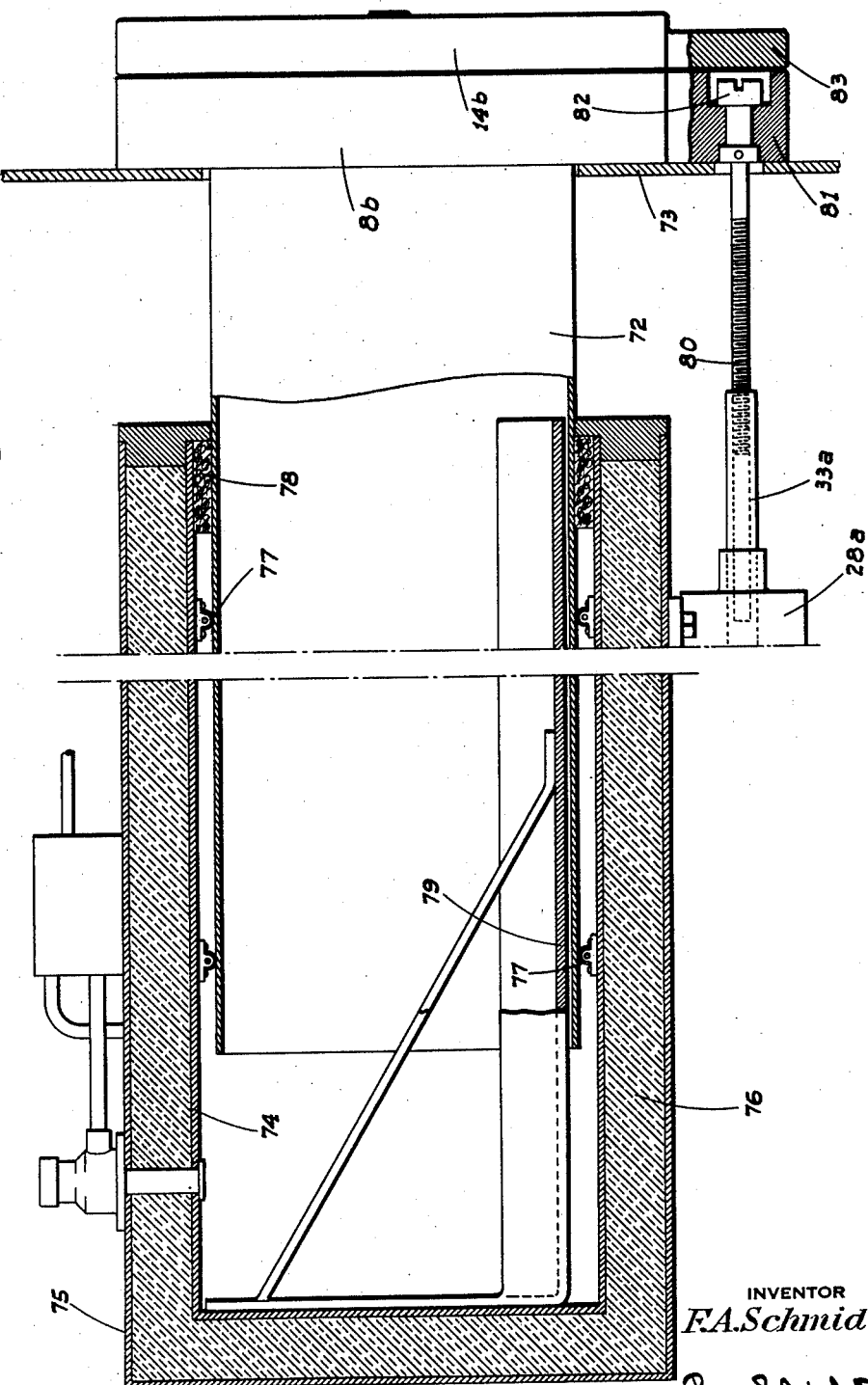

Jan. 17, 1939.   F. A. SCHMIDT   2,143,902
APPARATUS FOR CONTROLLING REFRIGERATION
Filed Jan. 22, 1936   9 Sheets-Sheet 8
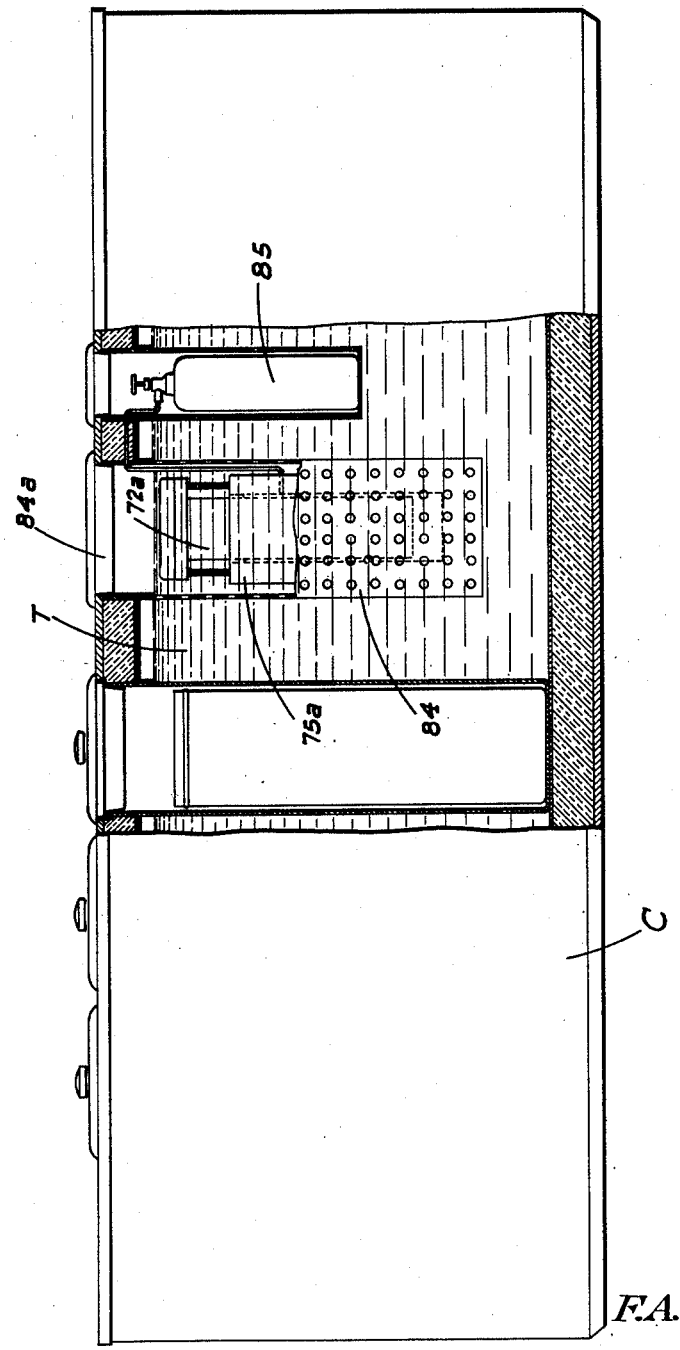
INVENTOR
F.A.Schmidt
BY
ATTORNEY

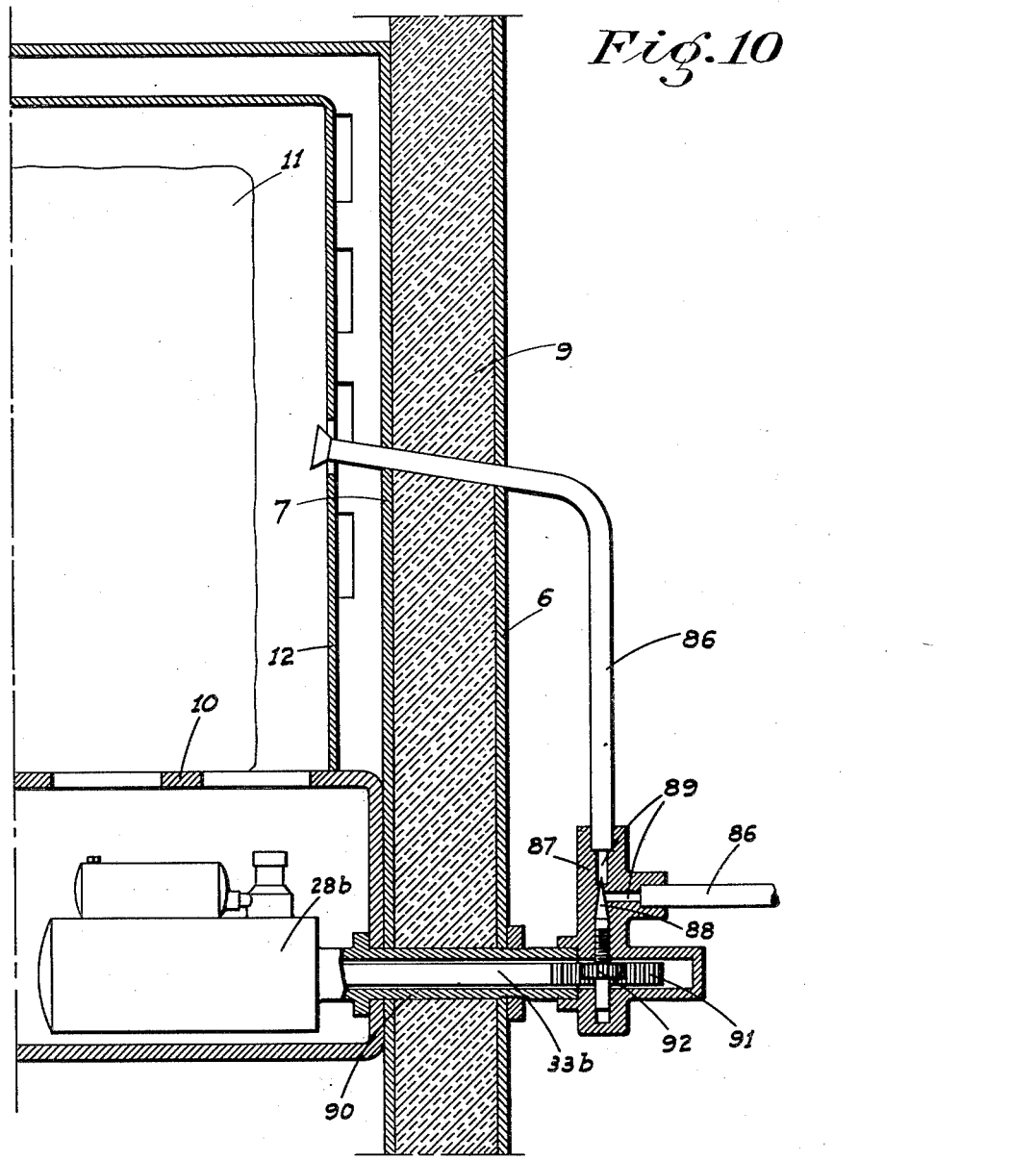

Patented Jan. 17, 1939

2,143,902

UNITED STATES PATENT OFFICE 2,143,902

APPARATUS FOR CONTROLLING REFRIGERATION

Fred A. Schmidt, South Gate, Calif.

Application January 22, 1936, Serial No. 60,253

19 Claims. (Cl. 62—91.5)

This invention relates generally to an apparatus for controlling refrigeration, air conditioning, and other forms of heat exchange and is particularly directed to controlling the sublimation of solidified carbon dioxide, solidified nitrogen or other forms of dry ice employed in the apparatus as the refrigerating medium.

The principal object of my invention is to provide a refrigerating apparatus, employing dry ice as the refrigerant, which is provided with a variable absorption area whereby to accurately control the temperature in an enclosed area, such as a refrigerator, in which the apparatus is mounted. I also provide a thermostatically actuated device to vary the absorption area according to the temperature within the refrigerator.

Another important object of my invention is to provide as a part of the apparatus a closed chamber in which the dry ice is placed, and a means to maintain a predetermined pressure within the chamber during the sublimation process.

A further object of my invention is to utilize the gas, resulting from the sublimation of the dry ice, as an insulating medium, as a precooling and food preserving and purifying agent and as a means to readily produce "charged" or carbonated water in a water container in a refrigerator.

An additional object of the invention is to provide an effective gas-tight seal for the door of the refrigerating apparatus so that the desired gas pressure in the dry ice chamber may be readily maintained.

It is also my object to provide a simple device to simultaneously shift the variable absorption controlling elements of two or more units of the refrigerating apparatus with the use of a single thermostat.

An additional object of the invention is to provide a means whereby the dry ice used as the refrigerant may be supplied to the dry ice chamber from a source of exterior supply such as a tank or drum containing liquid carbon dioxide or nitrogen; the flow of liquid from the tank to the chamber being thermostatically controlled by the temperature within such chamber.

The liquid thus flowing into the chamber expands, and turns to snow, providing the dry ice necessary for refrigerating purposes.

Another object of the invention is to provide a dry ice chamber adapted to either use dry ice in block form, or that supplied by the expansion of liquid fed into said chamber.

As a further object, I have provided a hydraulic type of thermostat for use with the refrigerator unit as will hereinafter appear, and which is extremely simple and relatively sensitive to changes in temperature.

These and other objects I accomplish by means of such structure and relative arrangement of parts as will fully appear by a perusal of the following specification and claims.

In the drawings similar characters of reference indicate corresponding parts in the several views:

Fig. 7 is a side view, partly in section, of a refrigerator car equipped with refrigerating units of the type shown in Figs. 5 and 6.

Fig. 8 is a fragmentary longitudinal section of a modified type of refrigerator unit suitable for use in brine tanks, etc.

Fig. 9 is a side view, partly in section, of an ice cream dispensing cabinet, containing brine, showing a refrigerating unit substantially of the type of Fig. 8 mounted therein.

Fig. 10 is a fragmentary sectional elevation of a refrigerator unit of the type shown in Fig. 2, equipped with the auxiliary apparatus to supply liquid carbon dioxide or the like to the refrigerating chamber when the dry ice therein is sublimed.

Referring now more particularly to the characters of reference on the drawings, and particularly, at present, to Figs. 1 to 4, the refrigerator shown comprises an upper main food refrigerating compartment 1 and a lower storage and precooling compartment 2. These compartments are provided with separate doors 3 and 4, respectively, and are completely surrounded by a suitable thick and porous heat and cold insulating material indicated at 5, such as cork or like composition.

Figure 1:
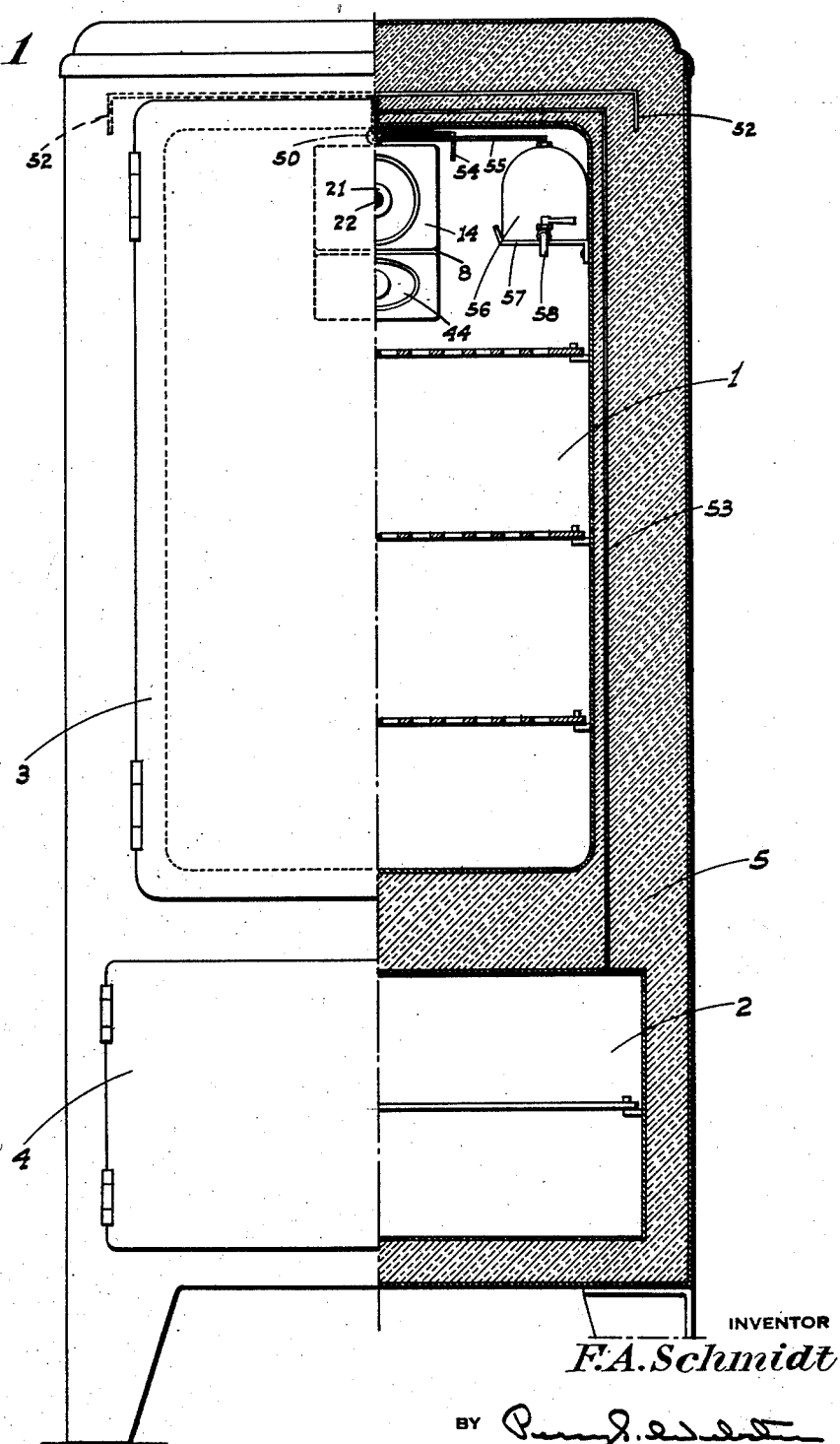
Fig. 1 is a front elevation half in section of a household refrigerator equipped with my improved refrigerating apparatus.
Figure 2:
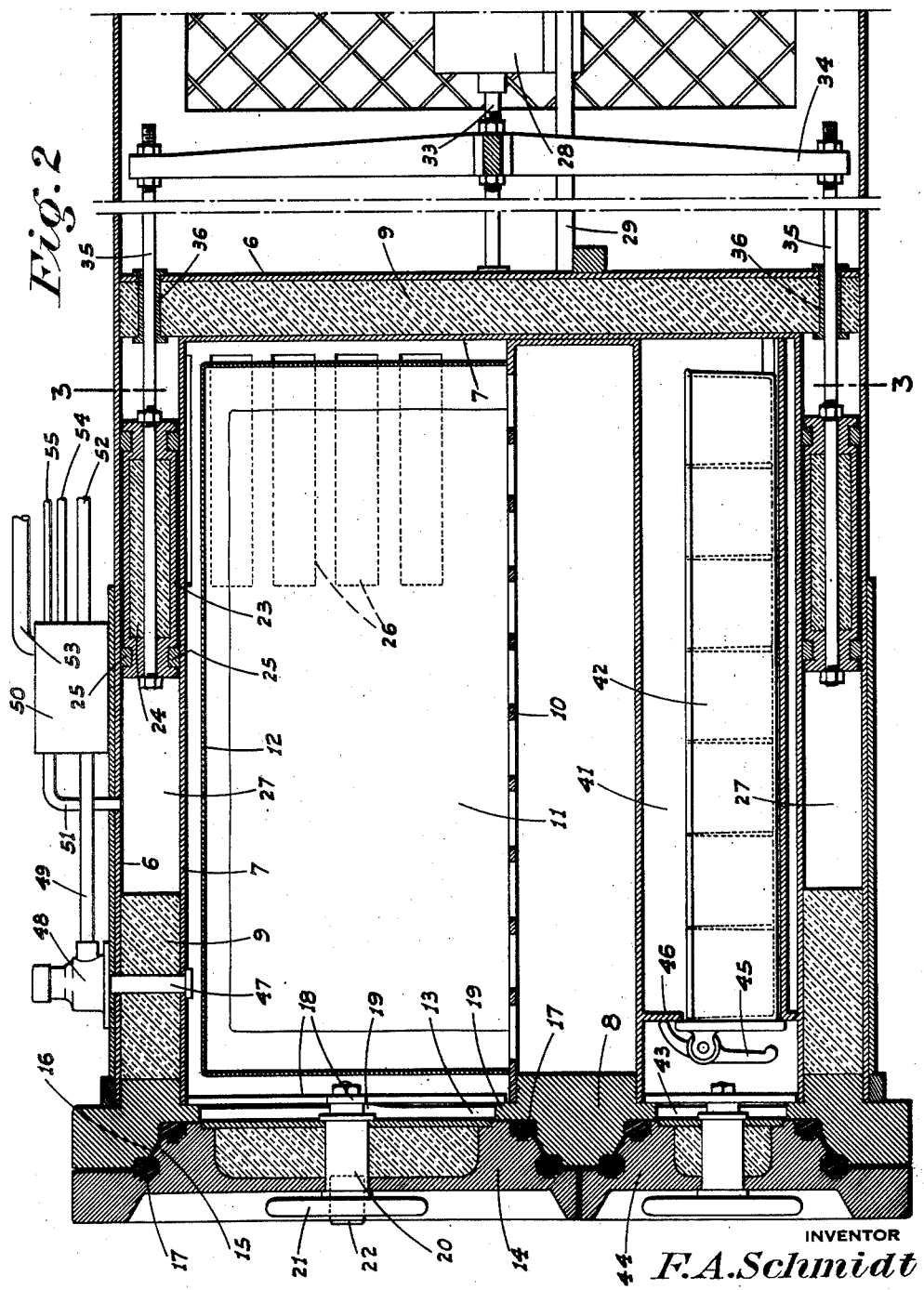
Fig. 2 is a fragmentary longitudinal section of the apparatus as used in such refrigerator, shown as provided with an ice-cube tray for freezing water ice.
Figure 3:
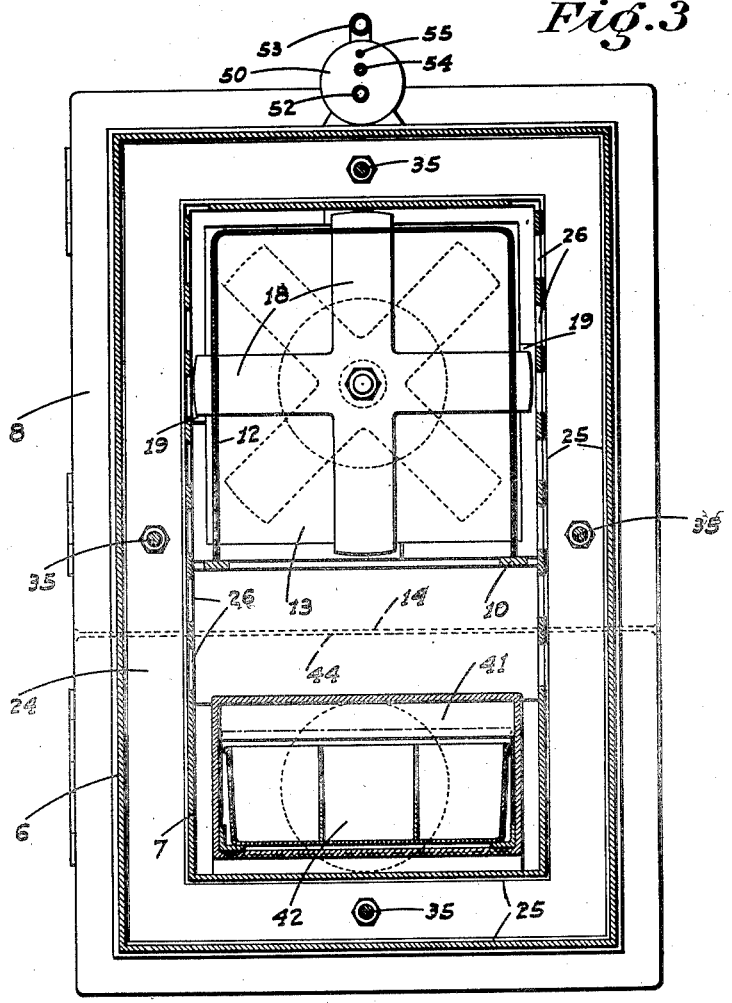
Fig. 3 is a transverse section of the apparatus taken on the line 3—3 of Fig. 2.

The refrigerating, or what I term the evaporator unit, is mounted in a suitable location in the compartment 1 and comprises essentially a closed chamber or compartment formed of an exterior shell 6 and an interior shell 7 spaced therefrom. At the front, the shells are rigidly connected to a thick door frame 8, of non-conducting material. The shells extend in the same spaced relation across the back of the chamber to enclose the same, and while said chamber is here shown as being rectangular in cross-section, it may be circular, oval or any other shape as may be found desirable or most practicable. The space between the shells 6 and 7 is filled with permanent insulation material 9 extending rearwardly from the door frame a certain distance; such material also filling the entire area between the shells at the back of the chamber, as shown in Fig. 2.

Disposed in said chamber and extending for the full length and width thereof intermediate the top and bottom of the same is a foraminous plate or rack 10 to support a block of dry ice 11. This block is enclosed by a cover 12 spaced from the inner shell 7 and resting on the rack, said cover being open on the bottom so as not to close the rack openings. The frame 8 above the rack is provided with an opening 13 of sufficient area to pass the ice block and cover therethrough. This opening is normally closed, by a thoroughly insulated door 14 hinged on the door frame. The outer portion of this door overlaps the frame and is formed inwardly of its outer periphery with a tapering portion 15 countersunk in a similarly tapered recess 16 in the door frame.

Endless pliable seal rings 17, permanently mounted in the door at the ends of the tapered portion, yieldably engage the corresponding portions of the door opening or recess when the door is closed, and positively seal said opening against leakage of gas. The door is held in a closed and sealed position by a locking cross-bar 18 on the inner side of the same, which is adapted to project through the opening 13 when the bar is turned to a certain position, and to engage sloping ledges or cams 19 extending about the periphery of the door-frame opening on the inside of the ice chamber. The bar is secured to a centrally disposed spindle 20 which is mounted in and projects through the door to an operating knob or handle 21 on the outside of the door; the knob and spindle unit being preferably provided with a suitable key locking means of conventional character and including a lock barrel indicated at 22.

When the bar is turned to a ledge engaging position by the rotation of the knob, the seal rings 17 are compressed and drawn up tightly against the door recess, thus positively preventing any leakage of gas. This gas-tight sealing of the door is a most important feature for various reasons. In the first place, it prevents the gas formed by the sublimation of the dry ice, from escaping. Secondly, it enables a gas pressure to be built up in the interior of the dry ice chamber or evaporator, which is necessary for the complete recovery or utilization of the gas energy. In the third place, it prevents a flow of air from passing through the evaporator, which would cause the moisture in the air to be absorbed and deposited in the interior as frost, and which would be detrimental to the proper operation of the variable absorption section.

The purpose of the key control of the knob or locking barrel is to prevent any unauthorized person, not familiar with the use of dry ice, from touching or trying to use the same as ordinary water ice is used, and which would be liable to burn or otherwise cause bodily harm to the person thus handling such dry ice.

Slidably mounted between the shells 6 and 7 in the space between the rear wall of the evaporator and the front insulation 9 is the variable absorption section. This is in effect a piston or plunger and comprises a casing 23 extending completely about said space. The casing is filled with insulation material 24 and is surrounded at both ends by insulation packing strips 25 engaging the inner faces of the corresponding shells so as to prevent leakage of gas therepast.

The surface of the shell 6 from the back wall of the chamber toward the front for a distance substantially equal to the length of the variable sections, forms the absorption or heat transfer area of the evaporator and is made of any suitable heat conducting material. The exterior of this portion of the shell may also be finned if desired in order to increase the area available for heat transfer while maintaining such area within a compact horizontal space. The portion of such area which is available at any time for absorption purposes is of course determined by the position of the variable insulated section or plunger relative to the back wall.

In order to insure the full efficiency of this absorption area, the sides of the corresponding portion of the inner uninsulated shell 7 are slotted as at 26 so as to provide direct connection with the ice chamber. The space between the permanent insulation 9 and the adjacent end of the variable section forms an insulation chamber 27 into which gas under pressure from the subliming ice block is fed to form the desired insulation, as will be seen, and which chamber is also of course of variable size as the variable section or plunger moves back and forth.

The variable section is moved lengthwise to alter the effective extent of the absorption area of the shell 6 according to the external temperature, or that in the refrigerator compartment 1, by thermostatic means. In the present instance, I have shown a hydraulic thermostat as being used for the purpose, though an electric or other form of thermostat may be used, if desired. This hydraulic thermostat comprises a closed cylinder 28 having suitable thermostatic liquid, which is mounted for axial movement in an exposed position beyond the evaporator, the axis of said cylinder being parallel to the plane of movement of the variable section.

Figure 4:
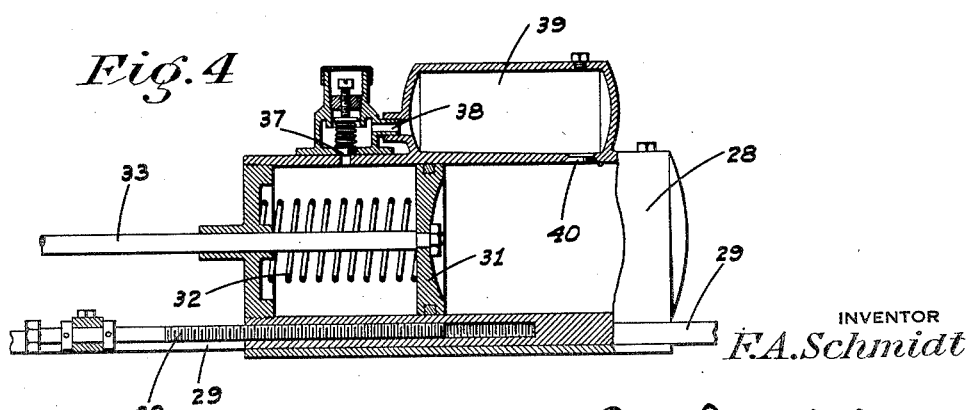
Fig. 4 is an enlarged sectional elevation of the thermostatic control unit.

The cylinder is here shown as being slidably supported on horizontal bars 29, the axial movement of the cylinder along the bars being effected by a rotary hand screw 30 mounted in connection with said bars and held against axial movement. The screw is parallel to the axis of the cylinder and is adjustably threaded into the same at the bottom between the bars, as shown in Fig. 4. A piston 31 is slidable in the cylinder; the space between the piston and the back end of the cylinder receiving the liquid and a compression spring 32 being disposed between the piston and the front end of the cylinder to retract the piston when the liquid contracts.

A piston rod 33 projects from the cylinder and is connected to a spider 34. This spider in turn is connected to push rods 35 which slidably project through guide and backing sleeves 36 in the back wall of the evaporator, to connections with the variable section, as shown in Fig. 2. By reason of this construction, it will be seen that as the liquid in the cylinder expands with an increase in the surrounding temperature, the piston will be advanced, pushing the variable section forwardly in the evaporator and increasing the effective surface of the absorption area of the evaporator. This of course results in a greater heat absorption from the surrounding air, which becomes colder, causing the liquid to contract and the piston to be returned to its original position. Separate automatic or thermostatic and manual adjustment of the variable section are thus obtained; the latter adjustment being performed when the apparatus is initially set up to insure the average or normal temperature within the refrigerator being maintained at a predetermined degree.

Mounted on and upstanding from the cylinder is an enclosed upwardly opening adjustable check or relief valve 37 communicating with the cylinder just back of the fully advanced position in the piston. A relief port 38 from the valve communicates with an auxiliary liquid chamber 39, which is normally filled with liquid above the level of the relief port and communicates with the cylinder 28 at its back end by a downwardly opening valve 40. If, therefore, the piston reaches a fully advanced position and a further liquid pressure is built up in the cylinder, the valve 37 opens, permitting the liquid to pass by the same and into the chamber 39. This affords a means of preventing an undesired increase of pressure in the cylinder with any excessive increase in temperature and expansion of the liquid.

Although for certain uses, the evaporator or ice chamber may be arranged so that the ice block occupies substantially the entire area thereof, for domestic refrigerators I preferably provide means to freeze water ice cubes such as are used for various purposes. To this end I provide a separate chamber 41 in the evaporator below the ice rack 10, which chamber extends to the adjacent portion of the door frame and is spaced from the inner shell 7 along the sides and bottom, and being shut off from the dry ice chamber. One or more conventional ice cube trays 42 are slidable in the chamber 41, being inserted or removed through an opening 43 in the door frame 8, which opening is closed and sealed by a hinged door 44 of the same construction as the door 14. The object of the sealed door for the cube chamber is to eliminate the danger of water or ice absorbing the bacteria of the various food or other material stored in the compartment 1. It may be here stated that scientific and laboratory tests have proved that ice cubes frozen in a container not absolutely air-tight and sealed are contaminated and not fit for human consumption.

To insure the non-sticking of the ice tray in the chamber, I provide a pull handle 45 on the front of the same in the form of a lever pivoted intermediate its ends on the tray; the top of this lever extending above the tray and engaging a rigid cross-member 46 as shown in Fig. 2. Thus when the lower end of the lever is pulled outwardly to pull the tray out, said lever will exert a prying action to loosen the tray, if stuck.

Projecting upwardly through the shells of the evaporator and communicating with the dry ice chamber is a conduit 47, leading to an adjustable upwardly opening relief valve 48, which is of the same type as the valve 37 of the thermostat. A pipe 49 from this valve leads to an exhausting container 50. From this container one pipe 51 leads to the insulation chamber 27, another pipe 52 discharges into the insulation 5, another pipe 53 leads to the precooling compartment 2, another pipe 54 leads to the food compartment 1 and another pipe 55 leads to a tank 56 for charged water. This tank is mounted in the compartment 1 on a bracket 57 and is provided with a draw-off faucet 58 as in Fig. 1. The gas being of course itself colder than any desired degree of refrigeration, effectively aids the refrigeration both of the refrigerator and the evaporator in keeping out heat. The sizes of these different pipes are proportioned so that the flow of gases therethrough will be different and according to the requirements of the parts to which they lead.

It may here be noted that the arrangement of these pipes in Fig. 2, as well as other figures, is diagrammatic; said pipes in practice leading from whatever points in the container 50 may be the most practicable. It is also to be noted that the door frame and door assembly, the rear insulated portion of the shell 7, the ice cover, ice trays, the variable section, the push rods and connected parts of the pressure control valve 48 are all of non-metallic or non-conducting material to prevent radiation and frosting. The absorption area of the outer shell 6, however, is of metal, as previously explained.

In operation, the block of dry ice being influenced by the absorption of heat from the exposed absorption area of the exterior shell, sublimes; resulting in the cold gas thus formed dropping to the bottom of the evaporator chamber and about the ice tray chamber. Continued subliming of the dry ice causes a gas pressure to be created in the bottom of the chamber and as the energy of the gas expends itself in absorbing heat, it becomes warm and rises to the ceiling of the inner shell 7, passing about the ice cover. All the foot pounds of work in the gas are thus employed in absorbing heat and practically 100% of the ice energy is utilized. As the gas pressure thus builds up within the evaporator, it opens the valve 48 which is set to yield only at a predetermined pressure. Such gas then passes through the container 50 from which it is distributed through the various pipes to serve its definite purposes, as previously described.

Danger of any excess gas pressure building up in the exhausting container or in the enclosures to which the gas if fed, will be eliminated by the provision of relief valves in the walls of the container or enclosures wherever necessary.

Figure 5:
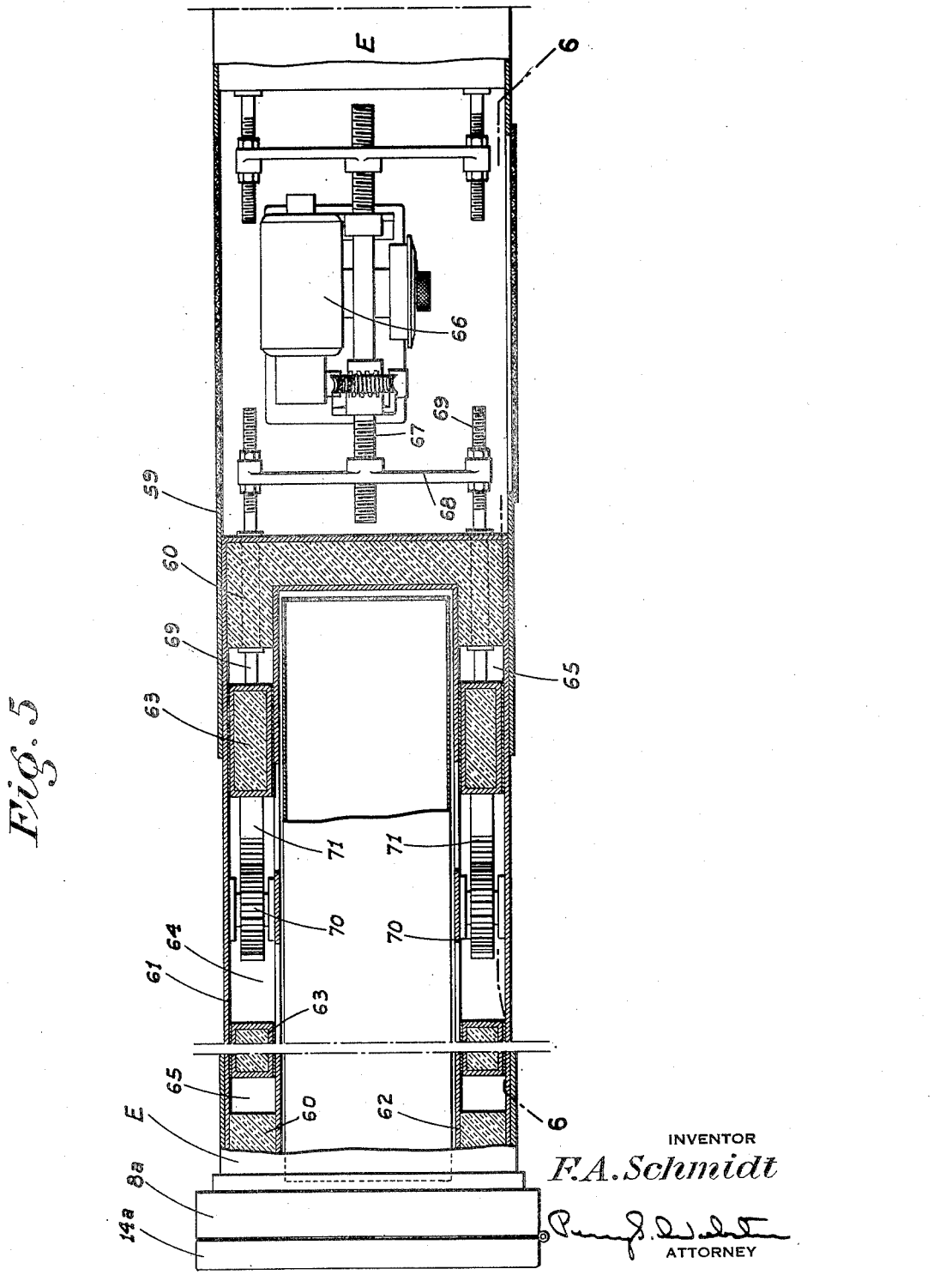
Fig. 5 is a fragmentary sectional plan of a double refrigerator unit employing a single thermostat control, suitable for larger installations.
Figure 6:
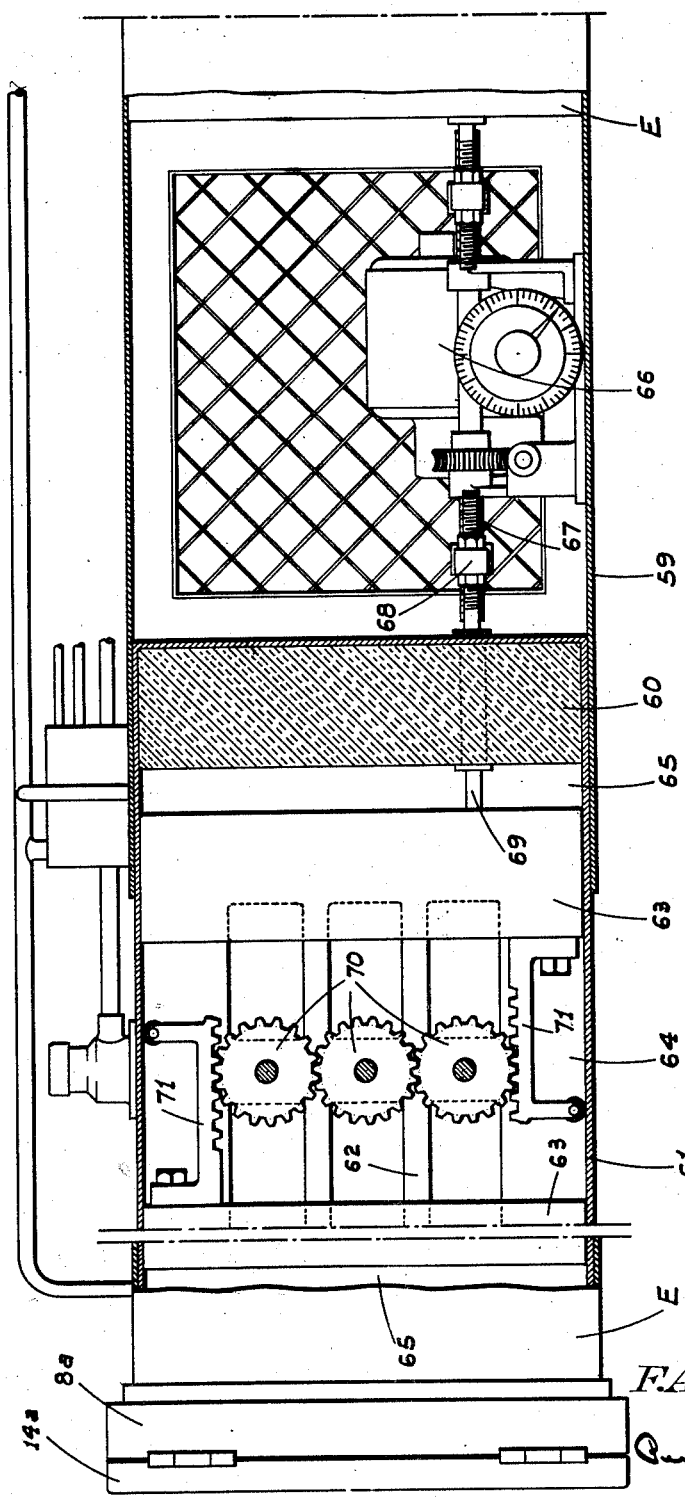
Fig. 6 is a sectional elevation of the same on the line 6—6 of Fig. 5.

The apparatus above described is for common refrigerators. For larger equipment, such as refrigerator cars and trucks, cold storage chambers and the like, I arrange the evaporators in connected pairs and as a double unit; moving the variable sections of the two evaporators by a single thermostat, as shown in Figs. 5 and 6 and as will now be described.

The two evaporators E constituting the double unit are longitudinally alined and spaced apart with their inner or back walls in face to face relation; the doors and door frames 14a and 8a, respectively, being in the outer or opposite ends of the evaporators and being the same in construction as those previously described. The evaporators are connected by an opening of the housing 59 extending therebetween and in which the thermostatic control mechanism is mounted, as will be seen. The evaporators are duplicates of each other and are of the same general construction as of the type previously described, but are somewhat larger.

Each evaporator has permanent insulation 60 between the outer and inner shells 61 and 62 in the opposite ends of the evaporator with a pair of longitudinally spaced variable insulated sections or plungers 63 slidably mounted between the shells and disposed in the space between the permanent end insulations. A chamber 64 is thus provided between the adjacent ends of the variable sections 63 and forms the uninsulated variable absorption area of the evaporator. The spaces between the adjacent ends of the variable sections and the end insulations 60 form the variable insulating chambers 65 which are insulated by the gas from the subliming ice as recited in the first described type.

Mounted in the housing 59 is an adjustable thermostat device 66 of a standard electric type, which includes a shaft 67 disposed in longitudinal alinement with the evaporators and rotated by the functioning of said device with any change in temperature from a predetermined set degree. Both ends of the shaft are threaded and have cross-arms 68 mounted thereon. These arms at their outer ends are adjustably connected to push rods 69 which project through the back walls and insulations of the corresponding evaporators and are connected to the adjacent variable sections or plungers 63. Rotation of the shaft causes the push rods and variable sections to be moved lengthwise, it being understood that the threads on the opposite ends of the shaft 67 are cut in opposite directions so that the variable sections of the two units will move in opposite directions.

In order to simultaneously move the other variable section of each evaporator in the opposite direction to the one connected to the push rods, I mount three vertically disposed intermeshing pinions 70 in the chamber 64. The upper and lower faces of the top and bottom pinions respectively engage horizontal racks 71 extending in opposite directions and connected to the adjacent ends of the variable sections 63 as shown in Fig. 6. By means of this construction it will be seen that the two variable sections of each evaporator move toward or away from each other simultaneously to either decrease or increase the effective absorption area of the evaporator. Not only does the one thermostat control the variable sections of both evaporators, but by reason of the interconnection of the variable sections of each evaporator as described, a relatively large absorption area increasing or decreasing action is had with a small thermostat shaft movement.

Units of this type are shown in Fig. 7, mounted along and suspended from the top of a refrigerator car R, so that a cooling effect for substantially the full length of the car will be had on the air within the car at the top, where it is most needed.

The two types of apparatus previously described use an interior movable variable absorption section as an inherent feature of their construction. Another type of apparatus is provided with an exterior movable absorption section, as shown in Fig. 8, this form of construction being suitable for apparatus to be used in brine tanks, etc. In this form of evaporator an uninsulated shell 72 is connected to and projects inwardly from the door frame 8b which in the arrangement shown is secured in a suitable water-tight manner against the side walls 73 of the brine tank, so that the evaporator extends horizontally into the tank at a level below the surface of the brine. The shell 72 is open at its inner end. The door frame 8b, as well as the cooperating door 14b, are of the same construction as shown and described in connection with the first type of device.

Mounted for longitudinal movement on and enveloping the major portion of the length of the shell 72 is the movable absorption section comprising inner and outer shells 74 and 75 respectively, the space between said shells being filled from end to end with suitable insulating material 76. Longitudinally spaced sets of rollers 77 are mounted in the shell 74 and engage the walls of the shell 72 so as to reduce friction.

An endless insulation packing gland 78 is mounted on the variable section at the end nearest the door frame and extends about the shell 72 in engagement therewith to prevent any leakage of gas past said shells. The shell 72 and the external movable section thus form a hermetically sealed chamber for dry ice, the variable absorption area of the chamber being that portion of the shell 72 which is exposed between the wall of the tank and the adjacent end of the outer movable section. An ice rack 79 is suitably supported from the back wall of the inner shell 74 and projects into the shell 72 in clearance relation therewith.

The movable section is moved according to variations in temperature in the tank by a thermostatic device which is preferably of the hydraulic type previously described; slight variations in its arrangement being necessary to enable the same to be manually adjusted from the outside of the tank. This device comprises a hydraulic thermostat cylinder 28a secured on the exterior shell 75 of the movable section, and thus immersed in the surrounding brine so that the liquid in the cylinder will be directly affected by the temperature of the brine. The piston rod 33a of the cylinder piston projects toward the door frame and is tapped to receive a threaded extension stem 80. This stem projects into and is turnably mounted, while held against axial movement, in an extension 81 of the door frame; the adjacent end of said stem having a head 82 exposed to the front of the extension and arranged to be rotated either by a screw driver or a wrench, as the case may be.

To prevent unauthorized tampering with the screw-stem, the door is provided with a shield element 83 which overlaps or covers the extension 81 when the door is closed. Turning the screw stem one way or the other will therefore cause the adjustable section to be shifted one way or the other altering the absorption area of the shell 72 as will be evident. This, of course, provides the initial manual adjustment of the unit, to initially set the absorption area to give a predetermined average refrigerating effect. Variations in temperature of the brine from said average will cause the thermostat cylinder 28a and the movable section to move one way or the other along the shell 72 to increase or decrease the exposed absorption area and the corresponding refrigerating effectiveness of the same, as such change of temperature may require.

A unit of this same general character is shown diagrammatically as mounted in a vertical depending position in the brine tank T of an ice cream dispensing cabinet C. In this case, the outer shell 75a of the refrigerating unit is immovable and is supported from the bottom of a foraminous casing 84, which in turn is suspended from the top of the cabinet and depends into the brine as shown, so that the brine also surrounds and contacts the shell 75a. The inner shell 72a is the movable one, and slidably engages the outer shell; access to the top door of said movable shell being had from the top of the casing, which is normally sealed by a suitable cover 84a.

In connection with any of the above described types of refrigerating unit, I may provide additional or auxiliary equipment, to release liquid carbon dioxide or the like into the ice chambers of the units when the dry ice is exhausted, so as to form snow in said chambers and thus maintain a refrigerating medium therein.

As shown, this equipment comprises one or more tanks 85 containing liquid carbon dioxide or the like. These tanks are mounted in any convenient position in the chambers to be refrigerated, as for instance is shown in Figs. 7 and 9. From the tank, a conduit 86 leads into the ice chamber of the refrigerator unit, of whatever type it may be; there being a thermostatically controlled valve interposed in said conduit to control the flow of liquid through said pipe. In the specific embodiment of this device, as mounted in connection with the refrigerator unit of the type of Figs. 2 and 3, and as shown in Fig. 10, the control valve structure comprises a casing 87 mounted outwardly of the unit behind the back wall thereof, said casing having a needle valve 88 therein, arranged to control the flow of liquid through the casing passages 89 which connect the adjacent ends of the conduit. The conduit beyond the casing projects through the back wall of the refrigerating unit and through the ice cover 12 to discharge into the interior of the dry ice compartment.

The valve casing is secured to a tubular extension 90 projecting through said back wall from the cylinder 28b of a thermostat device of the same character shown in Fig. 4, and through which extension the piston rod 33b from said cylinder projects. This cylinder is mounted within the refrigerator unit under the rack 10. The rod passes to one side of the needle valve and its adjacent portion is formed with rack teeth 91 which engage a pinion 92 mounted on the needle valve stem. This structure is arranged so that as the liquid in the cylinder expands under the influence of heat, the piston rod is moved to rotate the pinion and valve in a direction to open the latter. This admits liquid from the conduit 86 into the ice chamber, where it expands and turns into snow, thus forming dry ice and giving the desired refrigerating effect.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a closed container for a heat exchange medium, a portion of the walls of said container being of heat conducting material and being exposed whereby to allow of a heat transfer through said walls, and means controlled by the temperature adjacent and exteriorally of the container for altering the area of such exposed portion in direct proportion to the variation of such temperature.

2. In combination, a closed container for a heat exchange medium, a portion of the walls of said container being of heat conducting material and being exposed whereby to allow of a heat transfer through said walls, and means controlled by the temperature adjacent and exteriorally of the container for altering the area of such exposed portion, and means incorporated with said first named means to independently and manually alter such area.

3. A refrigerating unit comprising a closed container, a portion of the exterior walls of which are of heat conducting material and exposed for the transfer of heat, a support in the container for a block of solid refrigerant, means in the container adapted to maintain the refrigerant spaced from the walls of said container, an insulation section movably mounted in close association with said wall portion to alter the area of such portion available for heat transfer and thermostatic means to thus move said section.

4. A refrigerating unit comprising a gas tight container, said container including relatively movable wall sections slidably engaged with each other, a portion of one wall section adjacent and beyond the adjacent end of the other section being of heat conducting material and being exposed for the transfer of heat, and the other section being insulated against the transfer of heat, means to move one section relative to the other, a support in the container for a block of solid refrigerant, and means in the container adapted to maintain the refrigerant spaced from said one wall section.

5. A refrigerating unit comprising a gas tight container for dry ice, said container comprising spaced inner and outer shells, heat insulated closures at both ends of the shells, a plunger of insulation material slidably mounted between and extending completely about the shells, the surface of the outer shell from one end thereof to the adjacent end of the plunger forming the absorption area of the unit and being of uninsulated heat transfer material, and the shells from the opposite end of the plunger to the corresponding end of the unit being insulated against the transfer of heat therebetween, and thermostatic means to slide the plunger.

6. A structure as in claim 5 with manual means included in part with said thermostatic means to independently slide the plunger.

7. A structure as in claim 5, in which the inner shell is provided with openings in the zone of the absorption area of the outer shell.

8. A refrigerating unit comprising a gas tight container for dry ice and having a portion of its exterior surface of heat conduction material and exposed for the transfer of heat, a closed chamber for an ice-cube tray disposed within said container, in spaced relation to the walls thereof, and a door structure giving access to said chamber, the walls of the latter extending unbroken to the door structure to prevent communication between the chamber and container.

9. A refrigerating unit comprising a gas tight container for dry ice, said container comprising spaced inner and outer shells, heat insulated closures at both ends of the shells, a plunger of insulation material slidably mounted between and extending completely about the shells, the surface of the outer shell from one end thereof to the adjacent end of the plunger forming the absorption area of the unit and being of uninsulated heat conducting material, and the space between the shells beyond the opposite end of the plunger forming an insulation chamber, and means to feed gas from the subliming ice into said chamber.

10. A refrigerating apparatus comprising a pair of longitudinally alined and spaced units, each unit comprising a closed container for dry ice consisting of a stationary section and a movable section slidably cooperating with the stationary section, a portion of the walls of one section from and for a certain distance beyond the other section forming the absorption area of the unit, a single thermostat mounted between the units, and means between said thermostat and the movable sections of both units for moving both sections simultaneously with changes in temperature affecting said thermostat.

11. A refrigerating unit comprising a gas tight container for dry ice, said container comprising spaced inner and outer shells, heat insulated closures at both ends of the shells, separate plungers of insulation material slidably mounted between and extending completely about the shells intermediate their ends, the surface of the outer shell between said plungers forming the absorption area of the unit and being of uninsulated heat conducting material, and the shells beyond the opposite ends of the plungers being insulated against the passage of heat therebetween, thermostatic means applied to one plunger for moving the same and means connecting the plungers to cause the other plunger to move the same simultaneously with the movement of said one plunger and in the opposite direction.

12. A refrigerating unit comprising a gas tight container, a support for a block of solid refrigerant in the container, said container comprising a stationary section of heat conducting material, and a movable section slidably engaging said stationary section for a portion of its length, and insulated throughout against the transfer of heat, and thermostatic means to slide said movable section in a direction to increase the area of the stationary section exposed beyond the movable section with an increase in the surrounding temperature, and vice versa.

13. A refrigerating unit comprising a closed container for dry ice, a conduit leading to the container from exteriorly thereof and discharging into the container, the conduit being adapted at the end opposite the discharge end for connection with a supply of liquid carbon dioxide or nitrogen, a valve interposed in the conduit, and means to open the valve as the temperature within the container rises and including a thermostat device mounted within the container.

14. A refrigerating unit comprising a closed container for dry ice, a conduit leading to the container from exteriorly thereof and discharging into the container, the conduit being adapted at the end opposite the discharge end for connection with a supply of liquid carbon dioxide or nitrogen, a valve interposed in the conduit, a cylinder to contain a thermostatic liquid mounted within the container, a piston rod projecting from the cylinder and moved in one direction by the expansion of the liquid, and a connection between the rod and valve to open the latter with such movement of the liquid.

15. In a refrigerating unit, a container for a refrigerating medium, a portion of the container being of heat conducting material and forming a heat transfer area, an insulation slide, said slide being mounted in close association with said portion of the container, and being arranged to alter the effective extent of said heat transfer area upon movement of the slide, and means controlled by the temperature adjacent and exteriorly of the container to move the slide to alter the effective extent of the heat transfer area in direct proportion to the variation of such temperature.

16. In a refrigerating unit, a container for a refrigerating medium, a portion of the container being of heat conducting material and forming a heat transfer area, an insulation slide, said slide being mounted in close association with said portion of the container, and being arranged to alter the effective extent of said heat transfer area upon movement of the slide, and means controlled by the temperature adjacent and exteriorly of the container to automatically move the slide, and means incorporated with said first named means to independently and manually move the slide.

17. A device as in claim 16 in which said last named means comprises a thermostatic device which includes a member mounted in fixed relation with the container, and a longitudinally movable rod secured to the slide.

18. A refrigerating unit comprising a container for a refrigerating medium, said container including an outer wall and an inner wall spaced therefrom, a plunger of insulation material slidably mounted between the walls, the outer wall beyond one end of the plunger forming the absorption area of the unit and being of heat transfer material, and the walls beyond the other end of the plunger being insulated against the transfer of heat therebetween, and means to slide the plunger.

19. A refrigerating unit comprising a gas tight container for a solid refrigerant, said container including relatively movable wall sections slidably engaged with each other, a portion of one section adjacent and beyond the adjacent end of the other section being of heat conducting material and exposed for the transfer of heat, and the other section being insulated against the transfer of heat, and means to move one section relative to the other; said means comprising a thermostat device which includes a member mounted in fixed relation with one section and a longitudinally movable rod secured to the other section.

FRED A. SCHMIDT.